United States Patent [19]

Andersson et al.

[11] 3,991,813
[45] Nov. 16, 1976

[54] MELT CASTING APPARATUS

[75] Inventors: Conny Andersson, Viken; Kare Folgero; Bengt Fredriksson, both of Vasteras; Birger Hedberg, Hagfors; Steinar Steinarson, Hagfors; Karl-Erik Oberg, Hagfors, all of Sweden

[73] Assignee: Allmanna Svenska Elektriska Aktiebolaget, Vasteras, Sweden

[22] Filed: Sept. 11, 1975

[21] Appl. No.: 612,456

Related U.S. Application Data

[63] Continuation-in-part of Ser. No. 499,859, Aug. 22, 1974, abandoned.

[30] Foreign Application Priority Data

Aug. 23, 1973 Sweden............................. 7311465

[52] U.S. Cl................................. 164/259; 164/337
[51] Int. Cl.²................... B22D 27/00; B22D 37/00
[58] Field of Search................ 164/65, 66, 68, 133, 164/258, 259, 266, 335, 337; 266/36 P, 38

[56] References Cited
UNITED STATES PATENTS

| 124,700 | 3/1872 | Sellers................................... 266/38 |
| 2,976,587 | 3/1961 | Daussan............................... 164/65 |
| 3,013,316 | 12/1961 | Hornak et al........................ 164/65 |
| 3,125,440 | 3/1964 | Hornak et al........................ 164/66 X |
| 3,305,901 | 2/1967 | Gero..................................... 164/65 |

FOREIGN PATENTS OR APPLICATIONS 1,214,436  4/1960  France............................... 164/335

Primary Examiner—Travis S. McGehee
Attorney, Agent, or Firm—Kenyon & Kenyon Reilly Carr & Chapin

[57] ABSTRACT

A metal melt casting apparatus comprises a vessel for containing the melt and having a wall portion having a downwardly pointing melt tapping hole, the vessel tilting so that this wall portion can be raised and lowered. A fountain has a top for receiving the melt when registered with said tapping hole and a bottom for connection with the bottom of a mold. A gas-tight elastically deflectible sealing means interconnects the tapping hole and the fountain top when the mentioned wall portion is lowered thereon by tilting of the vessel. The sealing means is made in the form of two parts which elastically flexibly engage when the converter wall with the tapping hole is lowered on the top of the fountain, one part being connected to the wall and the other part being connected to the fountain. The sealing means is provided with a gas passage so that the tapping metal stream may be subject to evacuation for degassing or surrounded by an inert gas.

9 Claims, 4 Drawing Figures

MELT CASTING APPARATUS

The present application is a continuation-in-part of application Ser. No. 499,859 filed Aug. 22, 1974, now abandoned.

BACKGROUND OF THE INVENTION

To refine a metal melt, it may be charged in a tilting converter which tilts between upright and horizontal positions, the side of the converter that is downward being provided with a tapping hole and the converter being internally contoured so that the refined melt forms a space above it while a downwardly angled channel-type inductor provides for adjusting the temperature of the melt to that desired. The converter can be gas-tight and provided with means for injecting a pressurized-gas into the space above the melt, the gas being non-oxidizing or inert with respect to the melt. By controlling the gas pressure in the space, the tapping rate of the melt can be controlled.

The high degree of refinement obtainable in such a converter, cannot be adequately retained by normal casting equipment. Furthermore, because the converter is pressurized during tapping, the refined melt may discharge from the tapping hole in the form of diverging droplets or a spray, and cannot be handled by conventional equipment.

SUMMARY OF THE INVENTION

According to the present invention, the described type of converter is used in its horizontal position and filled with the refined melt under the gas pressure, the tapping hole, being provided with a gate valve, which when opened, permits a discharge of the melt at relatively high velocity and possibly in the form of a spray. For casting, bottom pouring equipment is used, comprising a fountain having a top end which is registered with the tapping hole and a bottom end which connects via a horizontal runner with the bottom of one or more molds. Two cooperating elastically flexible sealing members are used, one being attached to what is the bottom side of the converter when horizontal, and so as to surround the tapping hole, the other sealing member being attached to the fountain top. This permits the fountain to be moved into registration with the tapping hole while the vessel is tilted at least slightly, tilting of the vessel towards its horizontal position then lowering its side containing the tapping hole, so that the two sealing elements mate together in a gas-tight sealing manner. One or the other of the two elements may be provided with a gas passage permitting evacuation of the inside of the seal, for degassing of the descending melt, or for surrounding the melt flow with an inert gas. In addition, the sealing elements surround the tapped melt stream, and if it tends to spray, confines the melt so that it enters the top of the fountain.

Preferably, the tapping hole is surrounded by a depending shield and the fountain comprises a vertical runner having a funnel at its top, with the sealing elements surrounding these two parts. The shield and funnel may extend so as to almost or completely overlap while leaving a peripheral space between them. In this way the sealing elements can be protected from spraying melt metal.

BRIEF DESCRIPTION OF THE DRAWINGS

The preferred mode for carrying out the invention is illustrated by the accompanying drawings, in which.

DETAILED DESCRIPTION OF THE INVENTION

Figure 1:
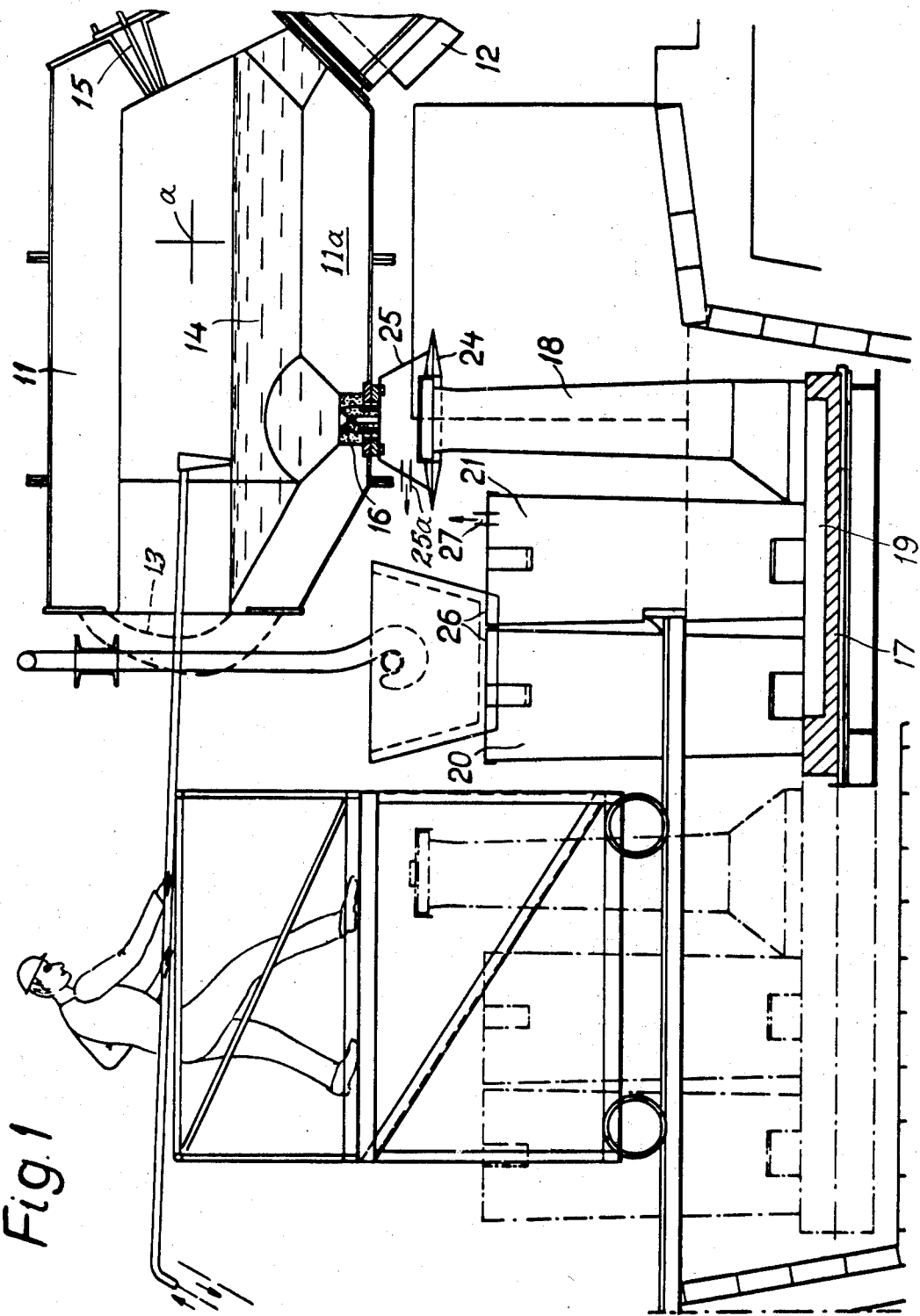
FIG. 1 in elevation, with the converter in vertical section, shows the manner in which the parts are interassociated, deslagging being under way and after which the converter is sealed air-tightly and the pressurized-gas injected, the tapping hole then being opened.

In the above drawings, FIG. 1 shows the converter 11 with the channel-type electric inductor unit 12 extending angularly downwardly with respect to the converter when it is tilted to its horizontal position as shown. The converter is shown with its charging opening opened and the refined melt being deslagged by workmen, the gas-tight cover 13 shown by broken lines in this figure, being applied and an inert or nonoxidizing pressurized-gas, such as Argon, being introduced to the space above the melt via a connection 15 opening into this space, during the tapping operation. The melt is under the pressure of the gas above it during tapping, and because this gas is inert, the melt is fully protected in its finally refined condition. The tapping hole is shown at 16 in FIG. 1, FIG. 4, described hereinafter, showing that this tapping hole can be readily opened for tapping. The tilting axis of the vessel 11 is indicated at (a) so that with the tapping hole 16 offset from this axis, the portion of the side 11a, which is bottom-most in the horizontal position, surrounding this tapping hole, can have a raising and lowering motion by appropriate tilting of the vessel 11. Bottom pouring is involved, the vertical riser or fountain 18 communicating via its bottom with a horizontal riser 19 formed in the mold stool 17 which is indicated as being movable. This horizontal riser 19 communicates with the bottoms of the molds 20 and 21 which rest on the mold stool 17.

According to the invention, the top of the fountain 18 is provided with an elastically flexible outwardly extending collar 24 which functions as the fountain's funnel while the bottom of the converter's side 11a has fixed to it an elastically flexible depending skirt 25 surrounding the tapping hole 16. When the converter 11 is tilted so that the side 11a around the tapping hole 16 lowers, the two elements 24 and 25 mate together in an elastically flexible manner to provide a substantially air-tight seal around the space between the top of the fountain and the bottom of the tapping hole 16. This space is shown as provided with a gas passage 25a which may be used for evacuation, as to degas the tapped melt stream, or to surround the latter with an inert gas. The sealing elements confine the melt in the event it sprays or forms diverging droplets.

The upper portions of the molds 20 and 21 are provided with gas-tight covers 26 having gas passages 27 which may be used either as exhaust outlets or for the introduction of an inert gas above the cast melt rising in the molds.

Figure 2:
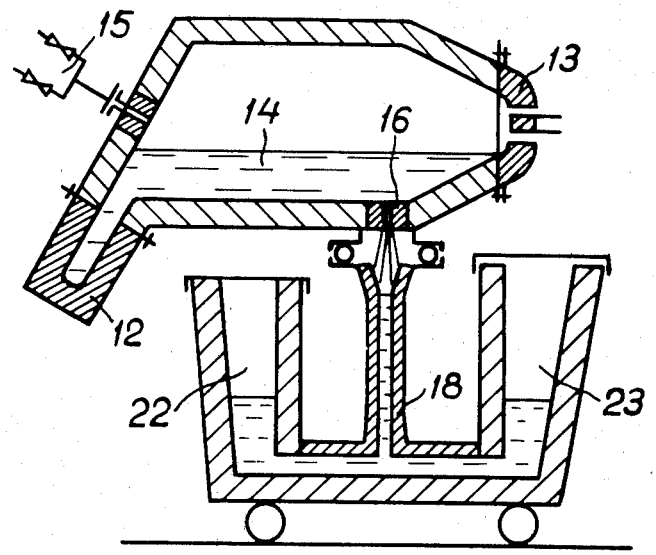
FIG. 2 in vertical section schematically shows a modification with the casting in progress.

In FIG. 2, the gas-tight cover 13 is shown in position with the connection 15 being supplied with the pressurized-gas. In this case the fountain 18 supplies the bottoms of the molds 22 and 23 spaced to either side of the fountain 18. The sealing arrangement is generally shown, but the details are shown by FIG. 3.

Figure 3:
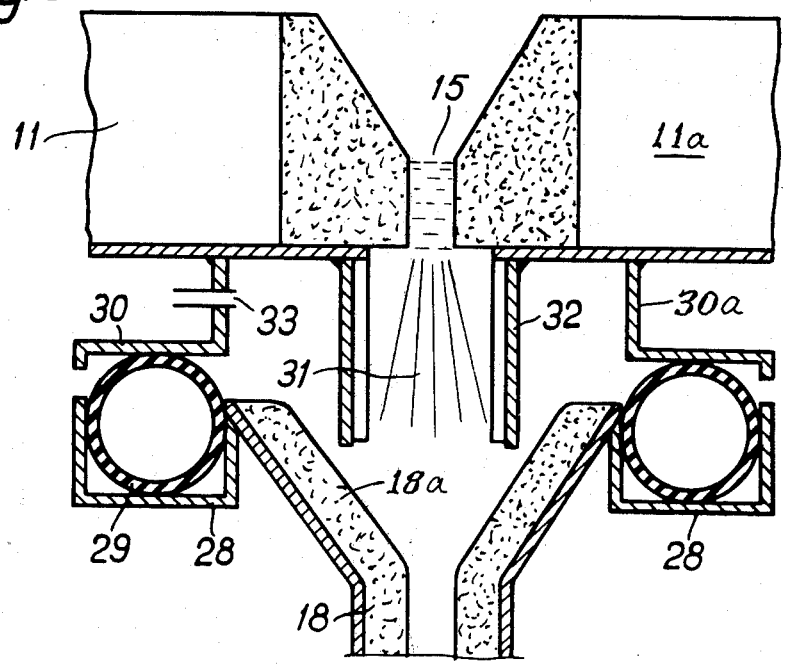
FIG. 3 in vertical section schematically shows a modification of the sealing arrangement.

Referring to FIG. 3, an annular tubular elastically flexible seal 29 is used, this being positioned in an upwardly facing channel 28 fixed to the top of the funnel 18a of the vertical riser comprising the fountain 18. The top of this sealing ring 29, when the vessel is lowered, is engaged by a downwardly facing annular surface 30 fixed to a cylindrical wall 30a which is, in turn, fixed to the wall 11a of the vessel 11. The tapped melt is shown as forming a spray 31 confined by a depending annular shield 32 fixed to the side 11a of the vessel, surrounding the tap hole and depending so that its lower end overlaps the upper end of the funnel 18a while leaving a peripheral space between these two parts. The gas passage or connection is shown at 33 as extending through the cylindrical wall 30a.

Figure 4:
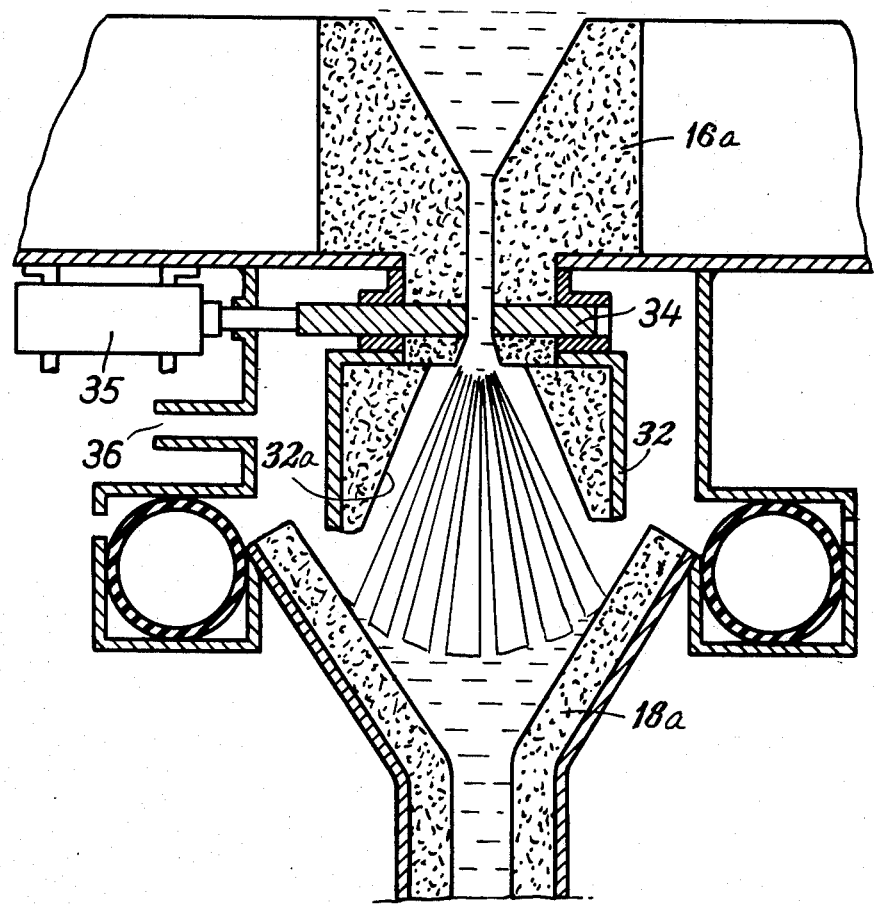
FIG. 4 is like FIG. 3 but shows a further modification.

In FIG. 4 substantially the same parts are shown but in this instance with the shield 32 depending from the housing of a sliding gate valve 34 actuated by a fluid-powered cylinder 35. The tap hole is in this case shown as formed by the usual refractory plug 16a with the refractory extending through the sliding gate valve portion, and in flaring fashion at 32a, the inside of the shield 32. The funnel 18a is, of course, also refractory lined as is the entire fountain runner. The gas passage 36 is again shown for use as described hereinabove.

Normally, the gas passage, as indicated at 25a, 33 and 36, would be used to evacuate the seal, the downwardly spraying melt being in particle form temporarily, for very effective degassing. In all cases, there is the elastic sealing action between the top of the fountain and the outside of the bottommost side of the converter when it is horizontal. Sealing is effected merely by lowering the converter portion around the tap hole, onto the fountain or vertical runner required for bottom pouring the melt into the molds.

We claim:

1. A metal-refining converter comprising an elongated vessel for containing a melt to be refined and which tilts so that it can be positioned upright or horizontal, said vessel having an upper end having a charging opening provided with a removable gas-tight cover and a lower end provided with a channel-type inductor and the vessel having a closable tapping hole in a side wall portion which is downward when the vessel is horizontal, said vessel having an internal contour permitting it when horizontal to hold said melt with a space above the melt, and said inductor having a channel positioned to receive and heat the melt when the vessel is horizontal, said vessel having means for injecting pressurized-gas into said space when the vessel is horizontal, a casting apparatus for said converter and comprising a fountain having a bottom end and an open top and which is positioned so that its open top is registered by said vessel's tap hole when the vessel is tilted to its horizontal position, at least one mold having a bottom end communicating with the fountain's said bottom end, and means for separably intersealing the vessel's said wall portion and the fountain's said open top when the vessel is tilted to its horizontal position.

2. The apparatus of claim 1 in which the fountain's said top end has an elastically flexible funnel and said wall portion has an elastically flexible collar around said tap hole and which separably engages said funnel.

3. The apparatus of claim 1 in which the fountain's said top end has an upwardly facing surrounding channel and said wall portion has a downwardly facing surface surrounding said tapping hole, and an elastically flexible sealing ring is positioned between said channel and surface.

4. The apparatus of claim 3 in which said ring is positioned in said upwardly facing channel and the latter is attached to said fountain.

5. The apparatus of claim 1 in which said wall portion has a downwardly extending shield attached thereto and surrounding said tapping hole.

6. The apparatus of claim 1 in which said sealing means has a gas passage therethrough.

7. The apparatus of claim 3 in which said downwardly facing surface is mounted by a cylindrical wall having a gas passage formed therethrough.

8. The apparatus of claim 7 in which said wall portion has a downwardly extending shield attached thereto and surrounding said tapping hole.

9. The apparatus of claim 8 in which the fountain's said top end has a funnel extending upwardly at least to approximately the level of the bottom of said shield and said gas passage opens through said cylindrical wall outside of said shield.

* * * * *